Figure 1:
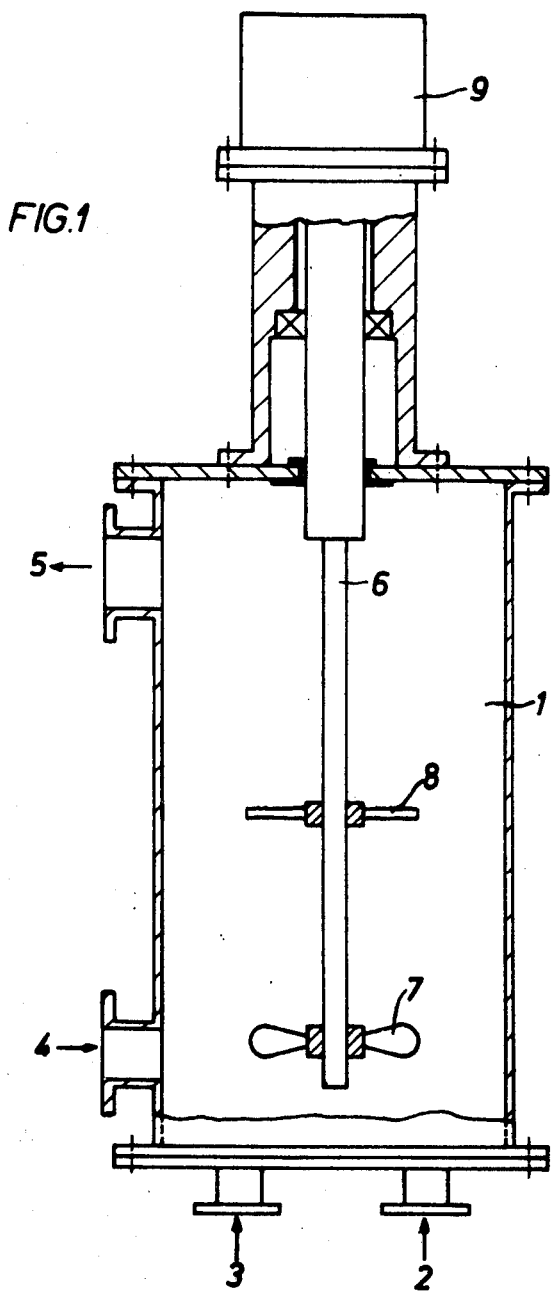

United States Patent [19]

Bischoff et al.

[11] 4,113,796
[45] Sep. 12, 1978

[54] PROCESS FOR WORKING UP DISPERSIONS OF ELASTIC-THERMOPLASTIC OR THERMOPLASTIC PLASTICS

[75] Inventors: Jürgen Bischoff, Dormagen; Friedrich Kowitz; Karl-Heinz Ott, both of Leverkusen; Herbert Schuster; Harry Röhr, both of Cologne; Hans Weitzel, Leverkusen, all of Fed. Rep. of Germany

[73] Assignee: Bayer Aktiengesellschaft, Fed. Rep. of Germany

[21] Appl. No.: 400,980

[22] Filed: Sep. 26, 1973

Related U.S. Application Data

[63] Continuation of Ser. No. 229,182, Feb. 24, 1972, abandoned, which is a continuation-in-part of Ser. No. 87,236, Nov. 5, 1970, abandoned.

[30] Foreign Application Priority Data

Nov. 21, 1969 [DE] Fed. Rep. of Germany ....... 1958498

[51] Int. Cl.$^2$ ........................... C08F 6/18; C08F 6/22; C08L 51/00
[52] U.S. Cl. ........................... 260/876 R; 260/880 R; 260/881; 260/885; 528/481; 528/485; 528/486; 528/487; 528/488; 528/490; 528/499; 528/500; 528/501; 528/503

[58] Field of Search ............. 260/876 R, 821, 94.7 R, 260/94.7 A, 86.1 R, 86.1 E, 93.5 R, 93.5 A, 85.5 R, 85.5 S, 89.3, 91.5, 880, 881, 885

[56] References Cited

U.S. PATENT DOCUMENTS

| | | | |
|---|---|---|---|
| 2,615,010 | 10/1952 | Troyan | 260/821 |
| 3,249,569 | 5/1966 | Fantl | 260/821 |

*Primary Examiner*—J. Ziegler
*Attorney, Agent, or Firm*—Connolly and Hutz

[57] ABSTRACT

Isolating thermoplastic or thermoelastic polymers in the form of a powder of limited water and precipitant content and uniform grain size from their aqueous dispersions wherein (i) a polymer dispersion and a precipitant are intensively mixed at an uptake of mechanical energy of 0.2 to 0.6 KWh per m$^3$ of dispersion thus causing high turbulence, (ii) the polymer is precipitated while in this state of high turbulence at a temperature below the sintering temperature of the polymer, (iii) the precipitated polymer particles are agglomerated and hardened while still in contact with the aqueous liquor either in one or in several stages, and (iv) the aqueous liquor and agglomerated polymer particles are separated from one another.

10 Claims, 1 Drawing Figure

INVENTORS:
JÜRGEN BISCHOFF, FRIEDRICH KOWITZ, HARRY RÖHR, KARL HEINZ OTT,
HERBERT SCHUSTER, HANS WEITZEL.

PROCESS FOR WORKING UP DISPERSIONS OF ELASTIC-THERMOPLASTIC OR THERMOPLASTIC PLASTICS

This application is a continuation of application Ser. No. 229,182 filed Feb. 24, 1972, and now abandoned, which, in turn, is a continuation-in-part of application Ser. No. 87,236 filed Nov. 5, 1970 and now abandoned.

This invention relates to a continuous multi-stage process for isolating elastic-thermoplastic or thermoplastic polymers in powder form from aqueous dispersions thereof.

It is known to isolate thermoplastic polymers from aqueous dispersions thereof which are obtained by emulsion polymerisation, by introducing such dispersions into a precipitant, separating off the coagulate formed, and washing and drying it.

The selection of the precipitant is governed by the type of emulsifiers, respectively dispersion stabilisers of the dispersion. Ionic emulsifiers of the n-docecyl benzene sulphate or n-alkyl sulphonate type require an electrolyte as a precipitant for example a 2 to 5% by weight aqueous aluminium or magnesium sulphate solution. Emulsifiers which are operable only in an alkaline environment, for example alkali metal salts of stearic acid, oleic acid or disproportionated abietic acid, can also be deactivated by dilute aqueous solutions of mineral acids or by organic acids such as formic acid, acetic acid or oxalic acid.

In this known process (referred to as "one-pot precipitation"), the coagulate is a powder with a highly irregular grain size distribution. Precipitant and water are occluded in particular in the larger powder grains. "One-pot precipitation" has to be carried out at elevated temperatures in order to obtain a minimum grain size suitable for filtration and to guarantee adequate hardening of the grain. At low precipitation temperatures the fine-grains portion of the powder cloggs the filters in the separation step by building up a water-impermeable layer.

Continuous precipitation processes are also known in which latex and precipitant are introduced into the first reactor of a reactor cascade comprising several reactors equipped with stirrers in an in-line arrangements and the coagulate is separated from the precipitation liquor after leaving the last reactor of the cascade in a continuously operating filtering device.

In this continuous process, the grain size and grain size distribution of the powder formed can be adjusted by suitably selecting the temperature in the individual reactors and by varying the ratio of dispersion to coagulant.

In this continuous process, three properties of the resulting powder which are important to subsequent processing, drying, handling and its further use remain unsatisfactory, namely:

1. Due to its large coarse-grain portion and to its highly unfavourable grain structure, the powder occludes appreciable quantities of water and precipitant. Accordingly, it has to be intensively washed. The moist material has to be freed from some of the water adhering to it before it is introduced into a continuously operating dryer, either by means of squeezing rollers or by means of a centrifuge. If this is not done irregular delivery of the moist material, lumping during drying and inadequate drying are encountered.

2. Even if the precipitation conditions are optimal a very wide grain size distribution is observed. This is undesirable as it gives rise to sedimentation effects, i.e., separation into coarse and fine components when the dried powder is carried through pipes, when it is to be fed uniformly into a continuously operating compounding machine, when dry powder is loaded for example in containers, or when it is desired to mix a powder of this kind with other thermoplastic materials.

3. In order to utilise a continuous processing set-up to its capacity constant flow of material through the apparatus and uniform properties (e.g. water content and apparent density) of the material is necessary. These requirements are not satisfied by conventional processing (cf. 1 + 2).

A process for isolating thermoplastic or thermoplastic-elastic polymers in the form of a powder of low water and precipitant content and uniform grain size from their aqueous dispersions has now been found, in which (i) a polymer dispersion and a precipitant are mixed intensively at an uptake of mechanical energy of 0.2 to 0.6 KWh per $m^3$ of dispersion thus causing high turbulence, (ii) the polymer is precipitated while still in this state of high turbulence at a temperature below the sintering temperature of the polymer, (iii) the precipitated polymer particles are agglomerated and hardened while still in contact with the aqueous liquor either in one stage or in several stages, and (iv) the aqueous liquor and agglomerated polymer particles are separated from one another.

Stages (i) and (ii) are usually carried out in a mixing reactor which operates at an energy consumption of 0.2 to 0.6 KWh per $m^3$ of polymer dispersion, i.e. generates high turbulence. Stage (iii) is carried out in a so-called precipitation cascade, i.e. in one or more vessels equipped with stirring mechanism arranged in line.

Two features distinguish the process of the invention from conventional precipitation processes:

1. High energy mixing to cause high turbulence, i.e. using a mixing apparatus operating at high energy consumption and generating high turbulence.
2. Precipitation in the state of energy uptake and high turbulence, i.e. in the mixing apparatus of (1), followed by agglomeration and solidification of the grain (in a precipitation cascade).

In this process polymers in powder form are obtained which are superior to powders obtained by conventional process as they show:
1. homogeneous and narrower grain size distribution,
2. small coarse-grain portion,
3. coherent grain structure,
4. reduced water content (approximately 50% lower as based on moist material).

These powders afford considerable advantages in the subsequent washing and further processing stages, for example: improved washing efficiency; quicker and more uniform drying and hence an increase in the drying capacity; a more uniform delivery through pipes and uniform loading of further-processing machines.

In a preferred embodiment of the invention, a flow mixer of the kind shown in FIG. 1 is used. This flow mixer constitutes a self-contained unit 1 of 20 to 150 liters capacity with three product inlets 2,3,4 and one product outlet 5, with a vertically arranged stirrer shaft 6, a propeller stirrer 7 being arranged at the lower end of the stirrer shaft and a disc stirrer 8 above the propeller. The unit is driven by an electric motor through a transmission gear 9 continuously adjustable from 1000 to 5000 r.p.m. The motor has an installed power output of 0.1 to 0.5 KW per liter of flow mixer capacity.

It is also possible to use other mixing gear, i.e. of different design provided it has the same power.

The actual precipitation is carried out in the mixing apparatus at a temperature below the sintering temperature of the polymer to be precipitated. The reaction temperature is preferably from 5° to 60° C. The quantities of polymer dispersion and precipitant are preferably adjusted to yield a precipitation liquor of a solids concentration of from 5 to 25% by weight at an average residence time in the mixing apparatus of from 1 second to 2 minutes.

On completion of precipitation, the precipitation mixture is passed through a reactor cascade of known design to promote hardening and agglomeration of the grain. Normally, a cascade of this type comprises from 2 to 4 reactors depending both upon the particular degree of hardening obtained in each reactor and upon the type of polymers to be precipitated. Since in the process according to the invention the actual process of precipitation takes place before entry into the precipitation cascade, two reactors are often sufficient.

According to the invention, it is possible to precipitate any thermoplastic or thermoplastic-elastic polymers.

Examples include polystyrene; copolymers or terpolymers of styrene with other resin-forming monomers such as acrylonitrile, methyl methacrylate, α-methyl styrene or other methyl nuclear-substituted or side-chain-substituted styrenes and halo-styrenes; polymethyl methacrylate; homopolymers and copolymers of vinyl chloride and vinyl acetate.

It is preferred to process elastic-thermoplastic polymers, so-called two-phase plastics. They can be obtained by mixing the latex of an elastomeric component, for example a copolymer of butadiene and acrylonitrile and/or styrene with the latex of a hard brittle compound for example a styrene- or α-methyl styrene-acrylonitrile copolymer and then precipitating the latex mixture by the process of the invention. It is also possible to graft styrene or methyl methacrylate onto a butadiene-styrene or butadiene-methyl methacrylate copolymer and to precipitate the aqueous dispersion of the resulting graft polymer by the process of the invention. Polymers of this kind are known as high impact polystyrene or high impact polymethyl methacrylate.

The process according to the invention is particularly suitable for processing so-called ABS graft polymers, for example products of the following composition:
(A) from 5 to 100% by weight, preferably from 5 to 60% by weight, of a graft copolymer obtained by the graft polymerisation of
  (a) 10 to 95% by weight, preferably from 10 to 80% by weight, of a mixture of
    (i) 50 to 90% by weight of styrene, methyl-substituted styrene, methyl methacrylate or a mixture thereof, and
    (ii) 50 to 10% by weight of acrylonitrile, methyl-substituted acrylonitrile, methyl methacrylate or a mixture thereof, and
  (b) from 90 to 5% by weight, preferably from 90 to 20% by weight, of a polymer of a conjugated diolefin containing at least 80% by weight of conjugated diolefin, and (B) from 0 to 95% by weight, preferably from 10 to 92% by weight, of a thermoplastic copolymer of
  (a) from 50 to 95% by weight, of styrene, methyl-substituted styrene, methyl methacrylate or a mixture thereof,
  (b) from 50 to 5% by weight of acrylonitrile, methyl-substituted acrylonitrile, methyl methacrylate or a mixture thereof.

The total sum of resin-forming monomers in components A and B, i.e. monomers Aa and monomers B should together not be less than 40% by weight of the total product.

As is apparent from their product specification, such moulding compositions can be prepared in two ways, namely:
  (a) a graft polymer A) respectively a copolymer B) is prepared by emulsion polymerisation, the latices are mixed and the resulting dispersion is coagulated by the process of the invention.
  (b) the resin-forming monomers are polymerised in the presence of the diene rubber, effecting at least partial grafting and the graft polymer dispersion formed is coagulated by the process of the invention.

In this process, it is important to apply emulsifiers which allow coagulation. The following are examples of suitable emulsifiers: sodium, potassium and ammonium salts of long-chain fatty acids with from 10 to 20 carbon atoms, alkyl sulphates with from 10 to 20 carbon atoms, alkyl-aryl sulphonates with 10 to 20 carbon atoms and alkali metal and ammonium salts of disproportionated abietic acid.

The type of precipitant used is governed solely by the emulsifiers present in the invention. Emulsifiers which are effective in acidic and alkaline environment (e.g. alkyl sulphates, aryl alkyl sulphonates and alkyl sulphonates) preferably require electrolytes, such as calcium chloride, magnesium sulphate or aluminium sulphate, in the form of their aqueous solutions. With emulsifiers which are ineffective at pH values below 7, acids, such as acetic acid or an aqueous solution of oxalic acid are suitable precipitants.

To carry out the process, the polymer dispersion, optionally additional water and the precipitant are usually introduced into the turned-on mixing reactor at a constant polymer dispersion feed and adjustable water and precipitant supply.

For optimum grain size distribution, water content and apparent density of the dried powder, the weight ratio of polymer dispersion to water to precipitant should be within the limits of 100:5:0.5 and 100:200:50. The additional water can be added to the dispersion or to the precipitant. In principle, separate addition is also possible.

A solids concentration of from 5 to 25% by weight and an average residence time of from 1 second to at most 2 minutes are preferably maintained in the mixing reactor.

When an aqueous solution is used as the precipitant, its concentration is preferably from 0.5 to 25% by weight for electrolytes and from 0.5 to 90% by weight for acids. Short-chain carboxylic acids, for example acetic acid, can also be used in pure form.

The precipitant should amount to from 0.01 to 20% by weight of the solid polymer.

Temperatures of from 75° to 98° C and an average residence time of from 10 minutes to 120 minutes should be maintained in the reactors of the following reactor cascade.

On leaving the precipitation cascade, the coagulate formed is separated off from serum, for example by means of a plane filter, band filter or rotary filter, washed with water and dried.

In accordance with the invention, it is possible to obtain thermoplastic or elastic-thermoplastic powders whose grain size distribution, grain texture and moisture content are very clearly superior compared to moulding compositions of this kind obtained by conventional processes. In addition, this process eliminates difficulties which hitherto were an obstacle to admixture with other thermoplasts, or to packaging in containers.

As stated previously one of the essential features of this invention is to introduce a sufficient amount of mechanical energy into the mixing polymer dispersion and precipitant.

The mixing energy necessary to generate high turbulence is from 0.2 to 0.6 KWh for one $m^3$ of polymer dispersion to be processed.

In order to measure the energy uptake in a given apparatus the motor driving the apparatus is fitted with a wattmeter. Then the apparatus is run empty. The wattmeter reading is recorded and indicates power used up in the apparatus itself. Another wattmeter reading is taken when the polymer dispersion and precipitant are put through. The difference of both readings indicates the actual power taken up by the mixing. Dividing this difference of the two readings by the flow rate in $m^3/h$ of the polymer dispersion results in the power consumption of the mixing in watts/$m^3$/h which can be easily expressed also as $KWh/m^3$.

The process according to the invention is illustrated in the following Examples in which parts and percentages are parts and percentages by weight unless otherwise stated.

EXAMPLE 1

Preparation of a styrene-acrylonitrile copolymer moulding composition from aqueous emulsion.

A. Starting components

Styrene-acrylonitrile copolymer latex
prepared by copolymerising 70 parts of styrene and 30 parts of acrylonitrile with 2.5% by weight (based on 100 parts by weight of monomer mixture) of the sodium salt of disproportionated abietic acid as emulsifier. Solids content of the dispersion 42%.
Precipitating agent
50% acetic acid
Additional desalted water
for diluting the dispersion

B. Precipitation apparatus

Main reactor: a 60 liter capacity refined steel mixing reactor whose stirring mechanism is in the form of a vertically arranged shaft with a propeller stirrer at its lower end and a disc stirrer above the propeller. The shaft is driven by a variable speed gear adjusted to 1500 r.p.m.. The apparatus is connected to a precipitation cascade comprising 4 heatable refined steel reactors each of 2 cubic meters capacity equipped with propeller stirrers (150 to 300 r.p.m.). The four reactors are connected together by overflows.

C. Precipitation

After the stirrer has been switched on, the following components are introduced into the mixing reactor through metering pumps at a temperature of 20° C:
    3000 liters per hour of the copolymer latex,
    9400 liters per hour of desalted water,
    70 liters per hour of 50% acetic acid.

The individual components are immediately intensively mixed through the high degree of turbulence, i.e. at an uptake of mechanical energy of about . . . KWh per liter of dispersion. A viscous precipitation mixture is formed, being introduced through an overflow into the following precipitation cascade to harden and agglomerate the grains. As the precipitation mixture flows from one reactor into the other, the stirring mechanism in each individual reactor is switched on and a temperature of 92° C is adjusted.

After passing through the precipitation cascade (average residence time 60 minutes), the powdered coagulate is separated off by means of a rotary filter, washed on the filter with water and delivered to a flash dryer.

Water content of the coagulate: before flash drying 20.1% after flash drying 0.2% Coarse grain component > 0.5 mm. diameter: 1.3% (i.e. component > 0.5 mm. in % as determined by screen analysis)

EXAMPLE 2

Test arrangement and reaction conditions as in Example 1. The following components are introduced into the precipitation apparatus:
1. 4200 liters per hour of a latex mixture of 1400 liters of a 30% graft polymer latex of 35 parts of styrene and 15 parts of acrylonitrile on 50 parts of polybutadiene, and 2800 liters of a 40% copolymer latex of 70 parts of styrene and 30 parts of acrylonitrile.
2. 3000 liters per hour of desalted water
3. 50 liters per hour of 90% acetic acid A plane filter is used instead of the rotary filter for working up. Results of measurements: see Table 1, column 1.

Comparison Example A

The procedure of Example 2 is repeated, except that the liquids are directly introduced into the first reactor of the precipitation cascade. Working up is carried out as in Example 2. Measurement results: see Table 1 column A.

Table 1

|  | Example 2 | Comparison Example A |
|---|---|---|
| Mixing reactor used | yes | no |
| Water content of the moist material in % | 23 | 43 |
| Apparent density of the dried powder g/l | 296 | 296 |
| Grain component > 0.5 mm. diameter in % | 0.9 | 18.5 |

The product worked up in accordance with the invention is considerably better.

EXAMPLE 3

Test arrangement and reaction conditions as in Example 1. The following components are introduced into the precipitation apparatus:
1. 3000 liters per hour of a latex mixture consisting of 1500 liters of a 30% graft polymer latex of 35 parts of styrene and 15 parts of acrylonitrile on 50 parts of polybutadiene, and 3300 liters of a copolymer latex of 70 parts of α-methyl styrene and 30 parts of acrylonitrile. Emulsifier for both starting latices: 2.0 parts (based on 100 parts of solid polymer) of the sodium salt of a n-alkyl sulphonate ($C_{12}$–$C_{16}$).

2. 2400 liters per hour of desalted water
3. 800 liters per hour of 10% aqueous magnesium sulphate solution.

Temperature in the precipitation cascade: 96° C..
The results set out in Tables 2 and 3 were obtained after isolation and drying of the moist material.

Comparison Example B

The procedure of Example 3 is repeated, except that the liquids are introduced directly into the precipitation cascade the first reactor of which is not heated. The precipitation mixture is worked up as in Example 3. The data obtained from measurements on the powder obtained are set out in Table 2 column B.

Table 2

|  | Example 3 | Comparison Example B |
|---|---|---|
| Mixing reactor used | yes | no |
| Water content of the moist material in % | 25.4 | 45.0 |
| Apparent density of the dry powder g/liter | 250 | 291 |
| Grain component > 0.5 mm. diameter in % | 0.9 | 17.5 |
| Grain texture | coherent grain | cracked irregular grain |

EXAMPLE 4

Test arrangement and reaction conditions as in Example 1. The following components are introduced into the precipitation apparatus:

1. 2470 liters per hour of a latex mixture consisting of 700 liters of a 36% latex of a butadiene-acrylonitrile copolymer (butadiene:acrylonitrile ratio = 65.35, emulsifier: n-alkyl sulphonate), and 1770 liters of a 39% styrene-acrylonitrile copolymer latex (styrene: acrylonitrile ratio = 70:30, emulsifier: n-alkyl sulphonate).
2. 8400 liters per hour of desalted water.
3. 4400 liters per hour of 25% aqueous sodium chloride solution.

The average residence time is 0.65 h.. The results set out in Table 3 under column heading Example 4 were obtained after the coagulate had been worked up.

Comparison test C

If the same components as in Example 4 are directly introduced in similar quantities into the first reactor of the precipitation cascade at a temperature of 30° C., a powder with the values set out in Table 3 under Column heading "Comparison Test C" is obtained after working up.

Table 3

|  | Example 4 | Comparison Test C |
|---|---|---|
| Mixing reactor used | yes | no |
| Water content of the moist material in % | 25.1 | 34.6 |
| Grain component > 0.5 mm in diameter in % | 4.1 | 14.5 |
| Apparent density of the dried powder g/l | 320 | 296 |

EXAMPLE 5

Test arrangement and reaction conditions as in Example 1. The following components are introduced into the precipitation apparatus:

1. 3000 liters per hour of a 39.6% polymethyl methacrylate latex. emulsifier: n-alkyl sulphonate
2. 5400 liters per hour of desalted water.
3. 850 liters per hour of 10% aqueous magnesium sulphate solution.

The reaction product is separated from the serum on a plane filter, washed with water and dried in a flash dryer. After drying, the powder has a moisture content of 0.21% and a grain component > 0.5 mm. diameter of less than 1.5%.

We claim:

1. A process for working up dispersions of thermoplastic or thermoelastic plastics into a powder of limited water and precipitant content and uniform grain size, said process consisting essentially of the steps of intensively mixing a polymer dispersion and a precipitant under conditions exhibiting a consumption of mechanical energy of 0.2 to 0.6 KWh per $m^3$ polymer dispersion to thereby generate high turbulence, precipitating polymer particles while maintaining said high turbulence at a temperature below the sintering temperature of the polymer, agglomerating and allowing the resulting polymer particles to harden in the precipitation liquor and separating the agglomerated and hardened polymer particles directly from the precipitation liquor in the form of a powder of uniform grain size, said polymer being selected from the group consisting of polystyrene, a copolymer of styrene and up to two monomers selected from the group consisting of acrylonitrile, methyl methacrylate, α-methyl styrene, other methyl-substituted styrenes and halo-styrene; polymethylmethacrylate; a homopolymer of vinyl chloride; a copolymer of vinyl chloride and vinyl acetate and a mixture containing (A) from 5 to 100% by weight of a graft copolymer obtained by the graft polymerization of
 (a) from 10 to 95% by weight of a mixture of
  (i) 50 to 90% by weight of styrene, methyl-substituted styrene, methyl methacrylate or a mixture thereof and
  (ii) 50 to 10% by weight of acrylonitrile, methyl-substituted acrylonitrile, methyl methacrylate or a mixture thereof and as grafting substrate
 (b) from 90 to 5% by weight of a polymer of a conjugated diolefin containing at least 80% by weight of conjugated diolefin, and (B) from 0 to 95% by weight of a thermoplastic copolymer of
 (a) from 50 to 95% by weight of styrene, methyl styrene, methyl methacrylate or a mixture thereof, and
 (b) from 50 to 5% by weight of acrylonitrile, methyl-substituted acrylonitrile, methyl methacrylate or a mixture thereof, the total sum of resin-forming monomers in components A and B being at least 40% by weight.

2. The process as claimed in claim 1 wherein the precipitant and polymer dispersion are intensively mixed in a flow mixer equipped with a stirrer shaft which has a propeller stirrer at its lower and a disc stirrer above the propeller stirrer.

3. The process as claimed in claim 2 wherein the flow mixer is followed by a precipitation cascade.

4. The process as claimed in claim 1 wherein precipitation is carried out at a temperature of from 5° to 60° C.

5. The process as claimed in claim 1 wherein the precipitation liquor has initially a solids content of from 5 to 25% by weight.

6. The process as claimed in claim 3 wherein the cascade has from 2 to 4 reactors.

7. The process as claimed in claim 1 wherein the quantitative ratio of dispersion to water to precipitant is within the range of from 100:5:0.5 to 100:200:50.

8. The process as claimed in claim 1 wherein the precipitant is an aqueous solution containing from 0.5 to 25% by weight of an electrolyte or from 0.5 to 90% by weight of an acid.

9. The process as claimed in claim 1 wherein the precipitant is a short chain carboxylic acid in pure form.

10. The process as claimed in claim 1 wherein the precipitant constitutes from 0.1 to 20% by weight of the polymer.

* * * * *